US012699582B2

(12) United States Patent
Singh et al.

(10) Patent No.: US 12,699,582 B2
(45) Date of Patent: Aug. 4, 2026

(54) DYNAMIC BUFFER LIMIT CONFIGURATION OF MONITORING AGENTS

(71) Applicant: VMware LLC, Palo Alto, CA (US)

(72) Inventors: Abhishek Singh, Bangalore (IN); Vinothkumar D, Tamil Nadu (IN); Atreyee Bhaduri, Bangalore (IN); Bhuvaneswari Addanki, Bangalore (IN); Akansha Srivastava, Lucknow (IN)

(73) Assignee: VMware LLC, Palo Alto, CA (US)

( * ) Notice: Subject to any disclaimer, the term of this patent is extended or adjusted under 35 U.S.C. 154(b) by 624 days.

(21) Appl. No.: 18/195,394

(22) Filed: May 10, 2023

(65) Prior Publication Data

US 2024/0320025 A1 Sep. 26, 2024

(30) Foreign Application Priority Data

Mar. 22, 2023 (IN) .............................. 202341020043

(51) Int. Cl.
*G06F 15/16* (2006.01)
*G06F 9/455* (2018.01)

(52) U.S. Cl.
CPC .. *G06F 9/45558* (2013.01); *G06F 2009/4557* (2013.01); *G06F 2009/45591* (2013.01)

(58) Field of Classification Search
CPC ......... G06F 9/45558; G06F 2009/4557; G06F 2009/45591; G06F 15/16
USPC ....................................................... 709/224
See application file for complete search history.

(56) References Cited

U.S. PATENT DOCUMENTS 7,523,191 B1 * 4/2009 Thomas .............. G06F 11/3476
709/224

* cited by examiner

*Primary Examiner* — Jude Jean Gilles

(74) *Attorney, Agent, or Firm* — Quarles & Brady LLP

(57) ABSTRACT

An example system may include a first endpoint executing a remote collector and a second endpoint in communication with the first endpoint. The remote collector may monitor the second endpoint. The remote collector may include an agent installation unit to install a monitoring agent with configuration data on the second endpoint. The configuration data may specify a configuration for the monitoring agent to monitor a first program executing in the second endpoint. Further, the second endpoint may include a buffer limit configuration unit to execute the monitoring agent in a test mode to determine a first number of metrics to be collected in one cycle based on the configuration data. Furthermore, the buffer limit configuration unit may configure a buffer limit of the monitoring agent based on the first number of metrics and, upon configuring the buffer limit, enable the monitoring agent to monitor the first program.

20 Claims, 5 Drawing Sheets

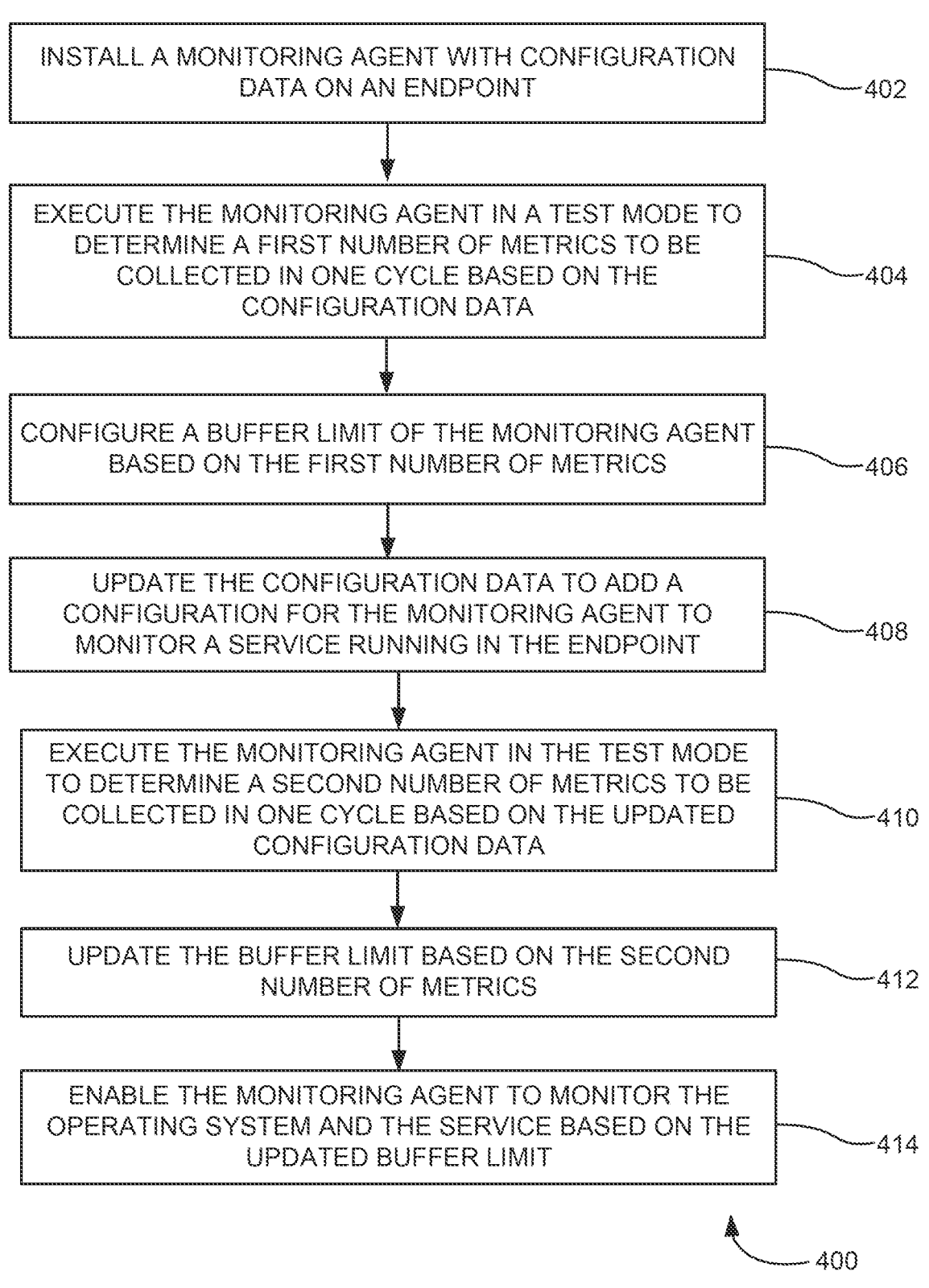

INSTALL A MONITORING AGENT WITH CONFIGURATION DATA ON AN ENDPOINT ⟋402

EXECUTE THE MONITORING AGENT IN A TEST MODE TO DETERMINE A FIRST NUMBER OF METRICS TO BE COLLECTED IN ONE CYCLE BASED ON THE CONFIGURATION DATA ⟋404

CONFIGURE A BUFFER LIMIT OF THE MONITORING AGENT BASED ON THE FIRST NUMBER OF METRICS ⟋406

UPDATE THE CONFIGURATION DATA TO ADD A CONFIGURATION FOR THE MONITORING AGENT TO MONITOR A SERVICE RUNNING IN THE ENDPOINT ⟋408

EXECUTE THE MONITORING AGENT IN THE TEST MODE TO DETERMINE A SECOND NUMBER OF METRICS TO BE COLLECTED IN ONE CYCLE BASED ON THE UPDATED CONFIGURATION DATA ⟋410

UPDATE THE BUFFER LIMIT BASED ON THE SECOND NUMBER OF METRICS ⟋412

ENABLE THE MONITORING AGENT TO MONITOR THE OPERATING SYSTEM AND THE SERVICE BASED ON THE UPDATED BUFFER LIMIT ⟋414

DYNAMIC BUFFER LIMIT CONFIGURATION OF MONITORING AGENTS

RELATED APPLICATIONS

Benefit is claimed under 35 U.S.C. 119(a)-(d) to Foreign Application Serial No. 202341020043 filed in India entitled "DYNAMIC BUFFER LIMIT CONFIGURATION OF MONITORING AGENTS", on Mar. 22, 2023, by VMware, Inc., which is herein incorporated in its entirety by reference for all purposes The present application is related in subject matter to U.S. patent application Ser. No. 18/195,399, which is incorporated herein by reference.

TECHNICAL FIELD

The present disclosure relates to computing environments, and more particularly to methods, techniques, and systems for configuring buffer limit of monitoring agents for optimized resource utilization.

BACKGROUND

In application/operating system (OS) monitoring environments, a management node that runs a monitoring tool (i.e., a monitoring application) may communicate with multiple endpoints to monitor the endpoints. For example, an endpoint may be implemented in a physical computing environment, a virtual computing environment, or a cloud computing environment. Further, the endpoints may execute different applications via virtual machines (VMs), physical host computing systems, containers, and the like. In such environments, the management node may communicate with the endpoints to collect performance data/metrics (e.g., application metrics, operating system metrics, and the like) from underlying operating system and/or services on the endpoints for storage and performance analysis (e.g., to detect and diagnose issues). Performance monitoring of such endpoints can be done using an agent-based or agentless approach. Agent-based monitoring has the advantages of being precise, granular, and having a large number of metrics. An example monitoring agent may be Telegraf™, an open-source tool that runs on the endpoints (e.g., VMs), collects metrics, and pushes the metrics to a remote collector (e.g., Cloud Proxy (CP)).

BRIEF DESCRIPTION OF THE DRAWINGS

FIG. 4 is a flow diagram illustrating an example method for configuring a buffer limit of a monitoring agent for monitoring an endpoint.

Figure 1:
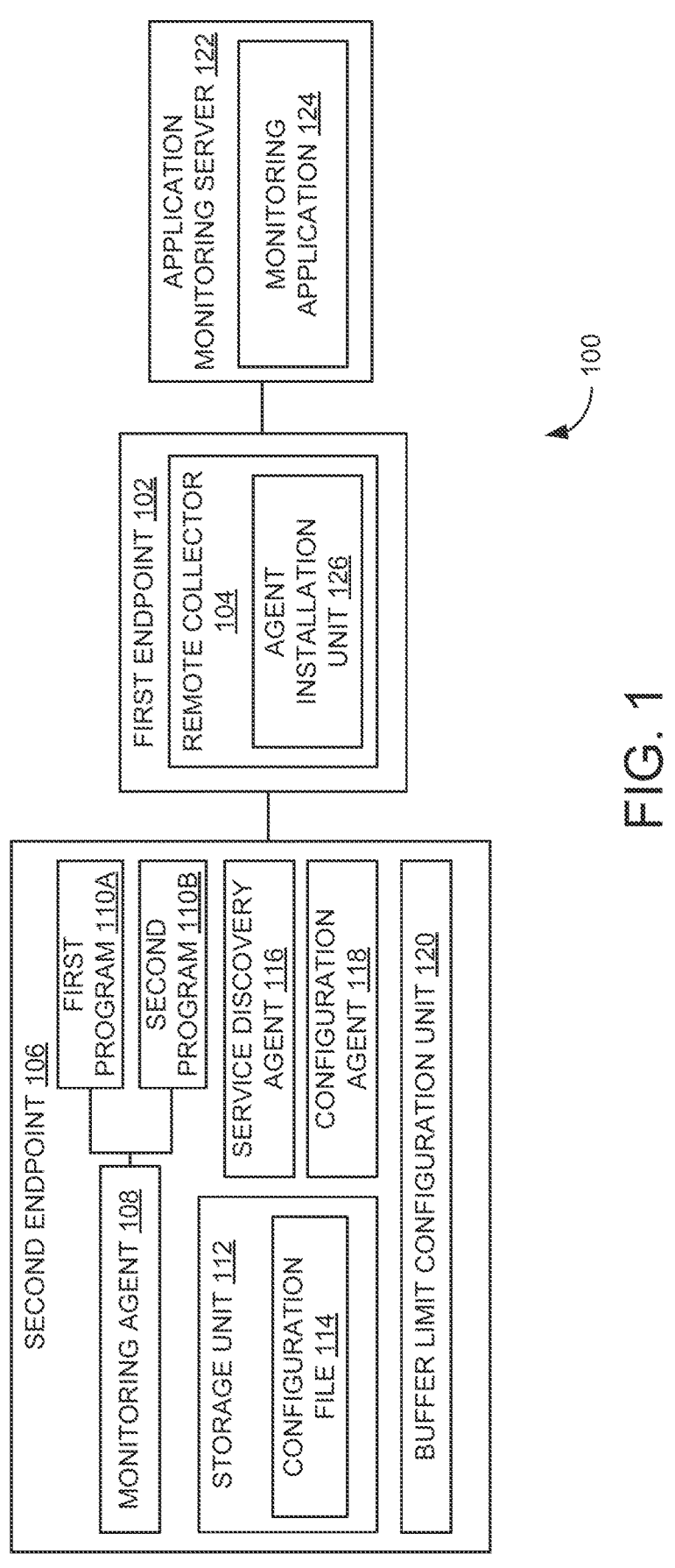
FIG. 1 is a block diagram of an example system, depicting a buffer limit configuration unit to configure a buffer limit of a monitoring agent for monitoring an endpoint.

The drawings described herein are for illustrative purposes and are not intended to limit the scope of the present subject matter in any way.

DETAILED DESCRIPTION

Examples described herein may provide an enhanced computer-based and/or network-based method, technique, and system to configure a buffer limit (e.g., a buffer size) of monitoring agents running in endpoints of a computing environment. An overview of the computing environment, existing methods to monitor endpoints, and drawbacks associated with the existing methods is provided below.

The computing environment may be a virtual computing environment (e.g., a cloud computing environment, a virtualized environment, and the like). The virtual computing environment may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in virtual space being hosted by one or more physical data centers. The virtual computing environment may include multiple physical computers (e.g., servers) executing different computing-instances or workloads (e.g., virtual machines, containers, and the like). The workloads may execute different types of applications or software products. Thus, the computing environment may include multiple endpoints such as physical host computing systems, virtual machines, software defined data centers (SDDCs), containers, and/or the like.

Further, performance monitoring of the endpoints has become increasingly important because performance monitoring may aid in troubleshooting (e.g., to rectify abnormalities or shortcomings, if any) the endpoints, provide better health of data centers, analyse the cost, capacity, and/or the like. An example performance monitoring tool or application or platform may be VMware® vRealize Operations (vROps), VMware Wavefront™, Grafana, and the like.

In some examples, the endpoints may include monitoring agents (e.g., Telegraf™, Collectd, Micrometer, and the like) to collect the performance metrics from the respective endpoints and provide, via a network, the collected performance metrics to a remote collector (e.g., a Cloud Proxy (CP)). For example, the monitoring agent such as Telegraf™ agent running on the endpoints may collect metrics and publish them to multiple metric receivers. An example Apache HTTPD server serves as the metrics receiver in the CP. For example, the Apache HTTPD server running in the CP may listen on a specific location directive on port 443 to receive the metrics from the Telegraf™ agent.

Further, the remote collector may receive the performance metrics from the monitoring agents and transmit the performance metrics to a monitoring tool or a monitoring application for metric analysis. A remote collector may refer to a service/program that is installed in an additional cluster node (e.g., an endpoint (a virtual machine)). The remote collector may allow the monitoring application (e.g., vROps Manager) to gather objects into the remote collector's inventory for monitoring purposes. The remote collector collects the data from the endpoints and then forward the data to an application monitoring server that executes the monitoring application. For example, remote collectors may be deployed at remote location sites while the monitoring tool may be deployed at a primary location. Furthermore, the monitoring application may receive the performance metrics, analyse the received performance metrics, and display the analysis in a form of dashboards, for instance. The displayed analysis may facilitate in visualizing the performance metrics and diagnose a root cause of issues, if any.

Furthermore, the monitoring agent such as Telegraf™ may be a plugin-based agent, i.e., plugins for collecting and publishing metrics. Input plugins may be responsible for collecting metrics of operating system and/or specific applications running in the endpoints and the output plugins may be responsible for publishing metrics to the remote collector (e.g., a HTTPD server). The behavior of the metrics collection, the input and output plugins may be customized using a configuration file of the monitoring agent. Some of the configurations of the configuration file may include:

Interval—Periodic data collection interval
 Buffer limit—For failed writes, the monitoring agent may cache metrics for each output, and flush the buffer on a successful write. When the buffer fills, the oldest metrics may be dropped first. This buffer only fills when writes to the output plugin(s) fail.
 Flush interval—Default flushing interval for all the output plugins. The flush interval is configured less than the periodic data collection interval. For example, a maximum flush interval may include a sum of the flush interval and flush jitter.
 Output plugins (e.g., [[outputs.http]])—Configuration for posting metrics to the HTTPD server.
 Input plugins (e.g., [[inputs.cpu]], [[inputs.mem]], [[inputs.net]], [[inputs. swap]], [[inputs.disk]], [[inputs.nginx]], [[inputs.mongodb]])—Configuration to collect the metrics of the operating system and specific applications.

The metrics from all the configured input plugins may be collected and stored in the buffer at regular intervals. Further, the metrics in the buffer may be posted to the output plugins at every "flush_interval" time. When writing the metrics to the output plugins fails, the metrics collected may be persisted in the buffer until a successful write happens. In this example, for failed writes, the monitoring agent may cache metrics for each output in the buffer and flush the buffer on a successful write. When the buffer gets full, the oldest metrics on the buffer may be dropped.

In some examples, consider that the data center is significantly huge, and the monitoring agent is installed on all the endpoints in the data center to collect the operating system metrics and metrics of applications running in the endpoints. In this example, if the remote collector is down or not reachable from the monitoring agent, then metrics collected at every collection interval on each endpoint may be stored in a respective buffer until the monitoring agent is able to successfully post the metrics to the remote collector. In some existing methods, the buffer size/limit may be configured as a constant value. For example, the value of the buffer limit is 10,000. i.e., a maximum of 10,000 metrics can be stored in the buffer.

The number of metrics collected for each endpoint may be determined by the factors such as hardware configurations (e.g., a number of central processing units (CPUs), disks, network interface cards (NICs)), number of applications running, instances of applications, software configurations, and the like. Each endpoint may have distinct factors that result in a different number of metrics. Thus, having a common "buffer limit" value for all the monitoring agents may not be feasible as the "buffer_limit" value can be greater or lesser than the actual number of metrics that will be collected in that endpoint. For example, having a higher value may result in denial-of-service (DoS) attack at the receiver, while having a lower value may result in not collecting all the data from a single collection cycle due to a lack of buffer space. When the DoS occurs due to significantly large size buffer at the monitoring agent side, then there will be a downtime of monitoring critical virtual infrastructure (e.g., the endpoint), which may be not acceptable.

Some existing methods may hardcode the "buffer limit" value to some average number to overcome the above-mentioned issue. However, hardcoding the "buffer limit" value to some average number may result in metric being missed and/or DoS. In another existing method, the buffer limit on the monitoring agents may be manually updated and the service may be restarted. However, manually updating the buffer limit may be a tedious and time-consuming process, particularly in significantly large environments. Some other existing methods may involve uninstalling the monitoring agent on the endpoints and reinstall when the DoS happens. However, reinstalling the monitoring agent might lose the state of input plugin configurations that are already done. Hence, the plugin activation has to be redone. In yet another existing method, reconfiguring the HTTPD server that collects metrics in the remote collector might help in avoiding the DoS. However, reconfiguring may require significantly more resources (e.g., RAM, CPU, Worker Threads, and the like) for the HTTPD server to accept and process all the requests. Extending the resource for recovering from DoS may not be feasible solution as the same problem might occur again if the environment is exponentially bigger and/or the collection interval is reduced.

For each input plugin, one hypertext transfer protocol (HTTP) message may be posted. If the number of metrics per plugin is significantly huge, the metrics may be divided into multiple HTTP messages. For example, consider that monitoring agent on each endpoint is configured with approximately 7 input plugins (e.g., 5 for operating system metrics and 2 for any application running in the endpoint). Further, for each collection cycle metric to be published to the remote collector, 7 HTTP POST calls may be made to the remote collector (e.g., cloud proxy's (CP's) port 443) on the listening location endpoint. Consider that the number of metrics collected in one collection cycle is 100 (approximately). If the remote collector is down for more than 20 collection cycles, then the buffers of the monitoring agents may be filled and start dropping oldest messages. Thus, there may be $20\times7=140$ HTTP POST calls waiting on the buffer. Once the remote collector is back online, then all the monitoring agents may be trying to flush all the POST calls to the remote collector, which spikes the CPU load to >90%. As a result, the HTTP server may face data forwarding problems, gaps in metrics collection, failure of REST API calls from the adapter to the cluster, and so on.

For example, the number of HTTP requests after the remote collector recovers from the failure may be high due to metrics of 20+ collection cycles being buffered on all the monitoring agents. At the receiving end (i.e., at the remote collector), the metrics collected may be kept on the server-side buffer. At every parsing interval (e.g., say 5 min), the metrics buffered may be parsed and updated at replica nodes. At any parsing cycle, only the latest collection metric may be parsed and the rest may be dropped. Thus, out of the 20+ collection cycle metrics that are buffered at the monitoring agent and posted to the remote collector, only one collection cycle data may be parsed and updated to the time series database. Hence, the aforementioned problem can be avoided by sending only the latest collection cycle metric data from the monitoring agent. To achieve this, the buffer limit of the monitoring agent should be configured with a number that will hold only one collection cycle data. Such a configuration may make the monitoring agent to hold only latest collection cycle metrics. Thus, even if the remote collector is down for a few days, on recovering, a significantly limited number of HTTP requests may be made.

Examples described herein may provide a buffer limit configuration unit to dynamically configure a buffer limit for a monitoring agent to monitor an endpoint. In an example, a system may include a first endpoint executing a remote collector and a second endpoint in communication with the first endpoint. The remote collector may monitor the second endpoint and send monitored information to a monitoring application. The remote collector may include an agent installation unit. Further, the second endpoint may include a buffer limit configuration unit. During operation, the agent installation unit may install a monitoring agent with configuration data on the second endpoint. The configuration data may specify a configuration for the monitoring agent to monitor a first program executing in the second endpoint.

Further, the buffer limit configuration unit may execute the monitoring agent in a test mode to determine a first number of metrics to be collected in one cycle based on the configuration data. Furthermore, the buffer limit configuration unit may configure a buffer limit of the monitoring agent based on the first number of metrics and, upon configuring the buffer limit, enable the monitoring agent to monitor the first program. Thus, the examples described herein may provide an ability to update the buffer limit at any time during the monitoring agent's lifetime, optimize resource utilization on the endpoint being monitored, and ensure that there is no DoS threat. Also, examples described herein may dynamically configure a unique buffer limit for each endpoint, which can reduce the network traffic.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Referring now to the figures, FIG. 1 is a block diagram of an example system 100, depicting a buffer limit configuration unit 120 to configure a buffer limit of a monitoring agent for monitoring an endpoint (e.g., a second endpoint 106). Example system 100 may include a computing environment such as a cloud computing environment (e.g., a virtualized cloud computing environment), a physical computing environment, or a combination thereof. For example, the cloud computing environment may be enabled by vSphere®, VMware's cloud computing virtualization platform. The cloud computing environment may include one or more computing platforms that support the creation, deployment, and management of virtual machine-based cloud applications or services or programs. An application, also referred to as an application program, may be a computer software package that performs a specific function directly for an end user or, in some cases, for another application. Examples of applications may include MySQL, Tomcat, Apache, word processors, database programs, web browsers, development tools, image editors, communication platforms, and the like.

As shown in FIG. 1, example system 100 may be a data center that includes multiple endpoints (e.g., first endpoint 102). In an example, an endpoint may include, but not limited to, a virtual machine, a physical host computing system, a container, a software defined data center (SDDC), or any other computing instance that executes different applications. For example, the endpoint can be deployed either in an on-premises platform or an off-premises platform (e.g., a cloud managed SDDC). An SDDC may refer to a data center where infrastructure is virtualized through abstraction, resource pooling, and automation to deliver Infrastructure-as-a-service (IAAS). Further, the SDDC may include various components such as a host computing system, a virtual machine, a container, or any combinations thereof. Example host computing system may be a physical computer. The physical computer may be a hardware-based device (e.g., a personal computer, a laptop, or the like) including an operating system (OS). The virtual machine may operate with its own guest operating system on the physical computer using resources of the physical computer virtualized by virtualization software (e.g., a hypervisor, a virtual machine monitor, and the like). The container may be a data computer node that runs on top of host operating system without the need for the hypervisor or separate operating system.

Further, second endpoint 106 may include a monitoring agent 108 to monitor applications or services or programs running in second endpoint 106. In an example, monitoring agent 108 may be installed in second endpoint 106 to fetch the metrics from various components of second endpoint 106. For example, monitoring agent 108 may real-time monitor second endpoint 106 to collect the metrics (e.g., telemetry data) associated with an application or an operating system running in endpoint 106. Example monitoring agent 108 may be Telegraf agent, Collectd agent, or the like. Example metrics may include performance metric values associated with at least one of central processing unit (CPU), memory, storage, graphics, network traffic, or the like.

Further, system 100 may include a first endpoint 102 in communication with second endpoint 106. In some examples, first endpoint 102 may execute a remote collector 104 (e.g., an a cloud proxy (CP), an application remote collector (ARC), or the like) to monitor plurality of endpoints (e.g., second endpoint 106) in the data center. Further, remote collector 104 may send monitored information associated with second endpoint 106 to a monitoring application 124. For example, remote collector 104 may receive the metrics (e.g., performance metrics) from monitoring agent 108 of second endpoint 106. Further, remote collector 104 may transmit the received metrics to monitoring application 124 running in an application monitoring server 122 to analyse the received metrics.

Furthermore, first endpoint 102 may be communicatively connected to application monitoring server 122 via a network. An example network can be a managed Internet protocol (IP) network administered by a service provider. For example, the network may be implemented using wireless protocols and technologies, such as Wi-Fi, WiMAX, and the like. In other examples, the network can also be a packet-switched network such as a local area network, wide area network, metropolitan area network, Internet network, or other similar type of network environment. In yet other examples, the network may be a fixed wireless network, a wireless local area network (LAN), a wireless wide area network (WAN), a personal area network (PAN), a virtual private network (VPN), intranet or other suitable network system and includes equipment for receiving and transmitting signals.

In some examples, remote collector 104 may include an agent installation unit 126. Also, second endpoint 106 may include buffer limit configuration unit 120. During operation, agent installation unit 126 may install monitoring agent 108 with configuration data on second endpoint 106. The configuration data may specify a configuration for monitoring agent 108 to monitor a first program 110A executing in second endpoint 106. For example, first program 110A may include an operating system, an application, or a combination thereof.

Further, buffer limit configuration unit 120 may execute monitoring agent 108 in a test mode to determine a first number of metrics to be collected in one cycle based on the configuration data. Furthermore, buffer limit configuration unit 120 may configure a buffer limit of monitoring agent 108 based on the first number of metrics. Further, buffer limit configuration unit 120 may enable monitoring agent 108 to monitor first program 110A upon configuring the buffer limit.

In an example, buffer limit configuration unit 120 may update the configuration data to add a configuration for monitoring agent 108 to monitor a second program 110B running in second endpoint 106. For example, the second program may include an application. Further, buffer limit configuration unit 120 may execute monitoring agent 108 in the test mode to determine a second number of metrics to be collected in one cycle based on the updated configuration data. Furthermore, buffer limit configuration unit 120 may update the buffer limit based on the second number of metrics. Upon updating the buffer limit, buffer limit configuration unit 120 may enable monitoring agent 108 to monitor first program 110A and second program 110B.

In another example, buffer limit configuration unit 120 may update the configuration data to remove a configuration for monitoring agent 108 to disable the monitoring of first program 110A. Further, buffer limit configuration unit 120 may execute monitoring agent 108 in the test mode to determine a third number of metrics to be collected in one cycle upon disabling the monitoring of first program 110A. Furthermore, buffer limit configuration unit 120 may update the buffer limit based on the third number of metrics. Upon updating the buffer limit corresponding to the third number of metrics, buffer limit configuration unit 120 may restart monitoring agent 108 to enable monitoring agent 108 to monitor second endpoint 106 (i.e., to monitor second program 110B).

In some examples, remote collector 104 may include an agent installation unit 126 to install a service discovery agent 116 on second endpoint 106. Service discovery agent 116 may discover a plurality of programs running in second endpoint 106 and send a list of the discovered programs to remote collector 104. Further, agent installation unit 126 may install a configuration agent 118 on second endpoint 106. Configuration agent 118 may receive command from a configuration master of remote collector 104 and execute the command to add an input plugin configuration for enabling monitoring of a program or remove the input plugin configuration for disabling monitoring of the program.

Further during operation, remote collector 104 may render the list of the discovered programs on a user interface of monitoring application 124 running in application monitoring server 122. Further, remote collector 104 may receive, via the user interface of monitoring application 124, an input plugin configuration to add a configuration for monitoring agent 108 to monitor second program 110B of the list of discovered programs running in second endpoint 106. Furthermore, remote collector 104 may initiate, via configuration agent 118, a command to update the configuration data to add the input plugin configuration to configuration file 114 of monitoring agent 108 for monitoring second program 110B.

Upon updating the configuration data, buffer limit configuration unit 120 may execute monitoring agent 108 in the test mode to determine the second number of metrics to be collected in one cycle based on the updated configuration data. Further, buffer limit configuration unit 120 may update the buffer limit based on the second number of metrics. Upon updating the buffer limit, buffer limit configuration unit 120 may restart monitoring agent 108 to enable monitoring agent 108 to monitor first program 110A and second program 110B.

Furthermore, remote collector 104 may receive, via the user interface of monitoring application 124, an input to delete the configuration for monitoring agent 108 to disable monitoring of first program 110A. Further, remote collector 104 may initiate, via configuration agent 118, a command to update the configuration data to remove the input plugin configuration from configuration file 114 of monitoring agent 108 to disable the monitoring of first program 110A.

Upon updating the configuration data to disable the monitoring of first program 110A, buffer limit configuration unit 120 may execute monitoring agent 108 in the test mode to determine the third number of metrics to be collected in one cycle upon removing the input plugin configuration from configuration file 114. Further, buffer limit configuration unit 120 may update the buffer limit based on the third number of metrics. Upon updating the buffer limit corresponding to the third number of metrics, buffer limit configuration unit 120 may restart monitoring agent 108 to enable monitoring agent 108 to monitor second endpoint 106.

In some examples, the functionalities described in FIG. 1, in relation to instructions to implement functions of monitoring agent 108, service discovery agent 116, configuration agent 118, buffer limit configuration unit 120, and any additional instructions described herein in relation to the storage medium, may be implemented as engines or modules including any combination of hardware and programming to implement the functionalities of the modules or engines described herein. The functions of monitoring agent 108, service discovery agent 116, configuration agent 118, and buffer limit configuration unit 120 may also be implemented by a processor. In examples described herein, the processor may include, for example, one processor or multiple processors included in a single device or distributed across multiple devices.

Further, the cloud computing environment illustrated in FIG. 1 is shown purely for purposes of illustration and is not intended to be in any way inclusive or limiting to the embodiments that are described herein. For example, a typical cloud computing environment would include many more remote servers (e.g., endpoints), which may be distributed over multiple data centers, which might include many other types of devices, such as switches, power supplies, cooling systems, environmental controls, and the like, which are not illustrated herein. It will be apparent to one of ordinary skill in the art that the example shown in FIG. 1, as well as all other figures in this disclosure have been simplified for ease of understanding and are not intended to be exhaustive or limiting to the scope of the idea.

Figure 2:
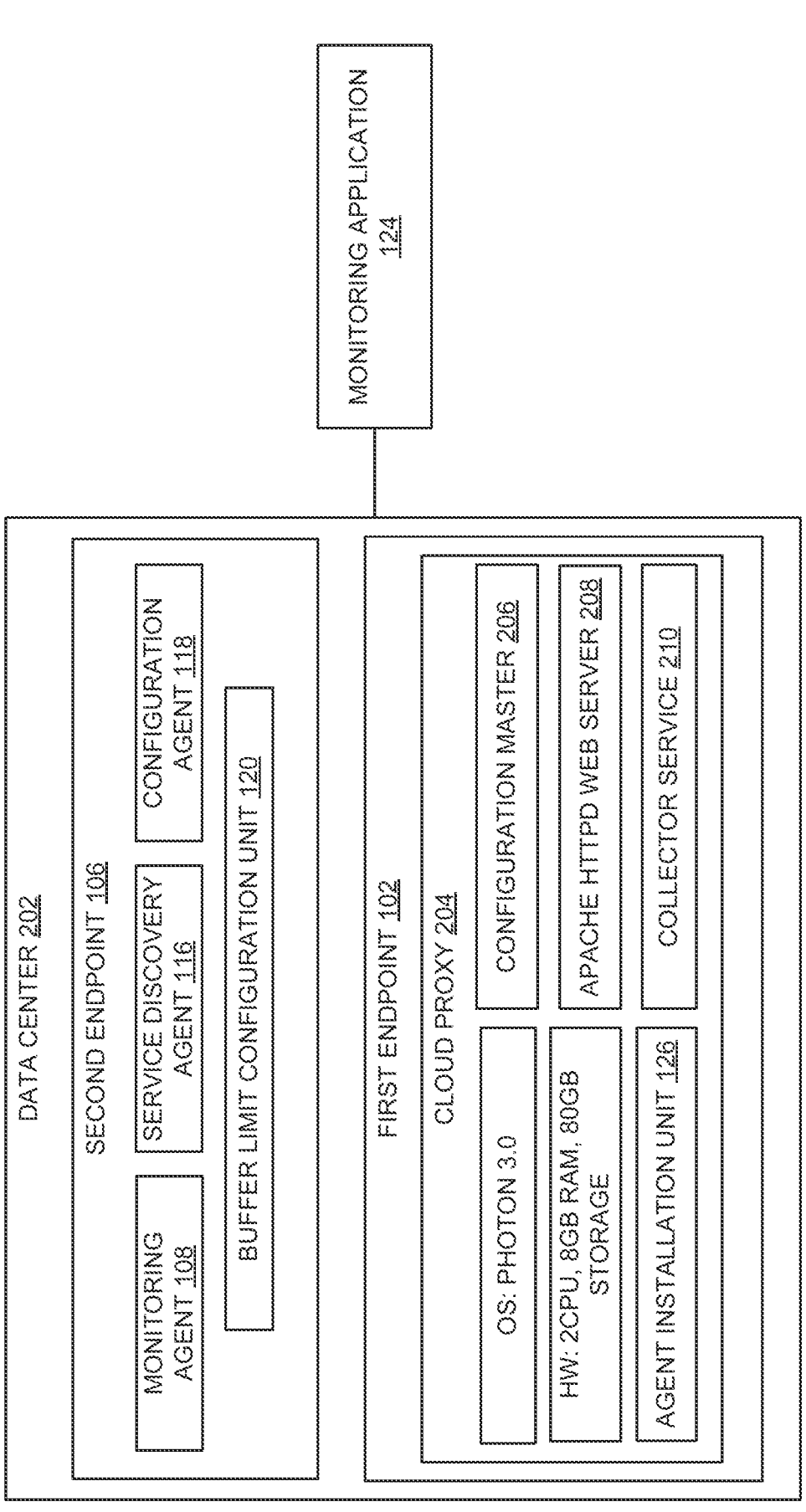
FIG. 2 shows a block diagram of an example data center, depicting a buffer limit configuration unit to configure a buffer limit of a monitoring agent to monitor an endpoint.

FIG. 2 shows a block diagram of an example data center 202, depicting a buffer limit configuration unit 120 to configure a buffer limit of a monitoring agent 108 to monitor an endpoint (e.g., second endpoint 106). For example, similarly named elements of FIG. 2 may be similar in structure and/or function to elements described with respect to FIG. 1. As shown in FIG. 2, example data center 202 includes first endpoint 102 and second endpoint 106. Further, data center 202 may be communicatively connected to monitoring application 124.

Example first endpoint 102 may include a remote collector. An example remote collector can be a cloud proxy 204, which may run on Photon operating system version 3.0, a processor (e.g., 2CPU), and a storage (e.g., 80 GB storage). Furthermore, the remote collector (e.g., cloud proxy 204) may include an Apache HTTPD web server 208 and a configuration master 206. In some examples, the remote collector may include a data plane and a control plane. For example, the data plane may be provided by Apache HTTPD web server 208 and the control plane may be provided via a Salt master (e.g., configuration master 206 running in first endpoint 102). Furthermore, the remote collector (e.g., cloud proxy 204) may include a collector service 210 to collect metrics from second endpoint 106.

In another example, the remote collector may be an application remote collector (ARC), which runs on Photon operating system version 1.0. In this example, the data plane may be provided by an EMQTT message broker (e.g., via MQTT Protocol) and the control plane may be provided via Salt master.

In some examples, the remote collector may use OpenSSL certificates and keys to secure endpoint communications (e.g., metric communications). Further, the remote collector may use Salt for control plane activities on second endpoint 106. The Salt may use a server-agent communication model, where a server component is referred to as the Salt master (i.e., configuration master 206) and an agent is referred to as the Salt minion (i.e., configuration agent 118). The Salt master and the Salt minion may secure communication through Salt master keys and Salt minion keys generated at first endpoint 102 on which the remote collector is resided. A Salt state may be applied from the Salt master to the Salt minion to apply control commands on second endpoint 106.

Furthermore, second endpoint 106 may include monitoring agent 108A (e.g., a Telegraf agent) to collect metrics, a service discovery agent 116 (e.g., a UCP minion agent) for service discovery, a configuration agent 118 (e.g., the Salt minion) for control actions, and a buffer limit configuration unit 120 to configure a buffer limit. During operation, buffer limit configuration unit 120 may dynamically update the buffer limit based on monitoring agent 108 (e.g., Telegraf agent) input plugin configurations. In an example, agent installation unit 126 may install the monitoring agent on endpoint 106 along with the input plugin configuration required for operating system metrics collection. Further, buffer limit configuration unit 120 may execute the monitoring agent in test mode to get the number of metrics that will be collected in one collection cycle for the current configuration (e.g., operating system metrics collection). Furthermore, buffer limit configuration unit 120 may set the number of metrics as a value for the buffer limit in monitoring agent 108's configuration.

Further in operation, buffer limit configuration unit 120 may initiate monitoring as a service. In an example, a configuration agent 118 (e.g., the salt minion) and a service discovery agent 116 (e.g., the ucp minion) may be installed during the installation of monitoring agent 108. Once the curated list of services is discovered by the ucp minion, buffer limit configuration unit 120 may add the input plugin configuration for monitoring a particular service to a configuration file of the monitoring agent 108 using configuration agent 118. Further, buffer limit configuration unit 120 may execute monitoring agent 108 in test mode to get the number of metrics that may be collected in one collection cycle for the updated configuration. Furthermore, buffer limit configuration unit 120 may modify the value of the buffer limit in the configuration file to a new value (i.e., the number of metrics). Upon modifying the buffer limit, the monitoring agent may be restarted. Further, the buffer limit can be modified for any new application or service using the above process. Furthermore, to stop monitoring of an application, the respective input plugin content can be removed from the configuration file using configuration agent 118. Upon disabling the monitoring of the application or service, the buffer limit may be modified by execute monitoring agent 108 in test mode as explained above.

Thus, examples described herein may provide the buffer limit configuration unit to dynamically change the metric buffer limit to the exact number of metrics that will be collected in a cycle on every reconfiguration of the monitoring agent 108 (e.g., addition or deletion of the input plugins).

Figure 3:
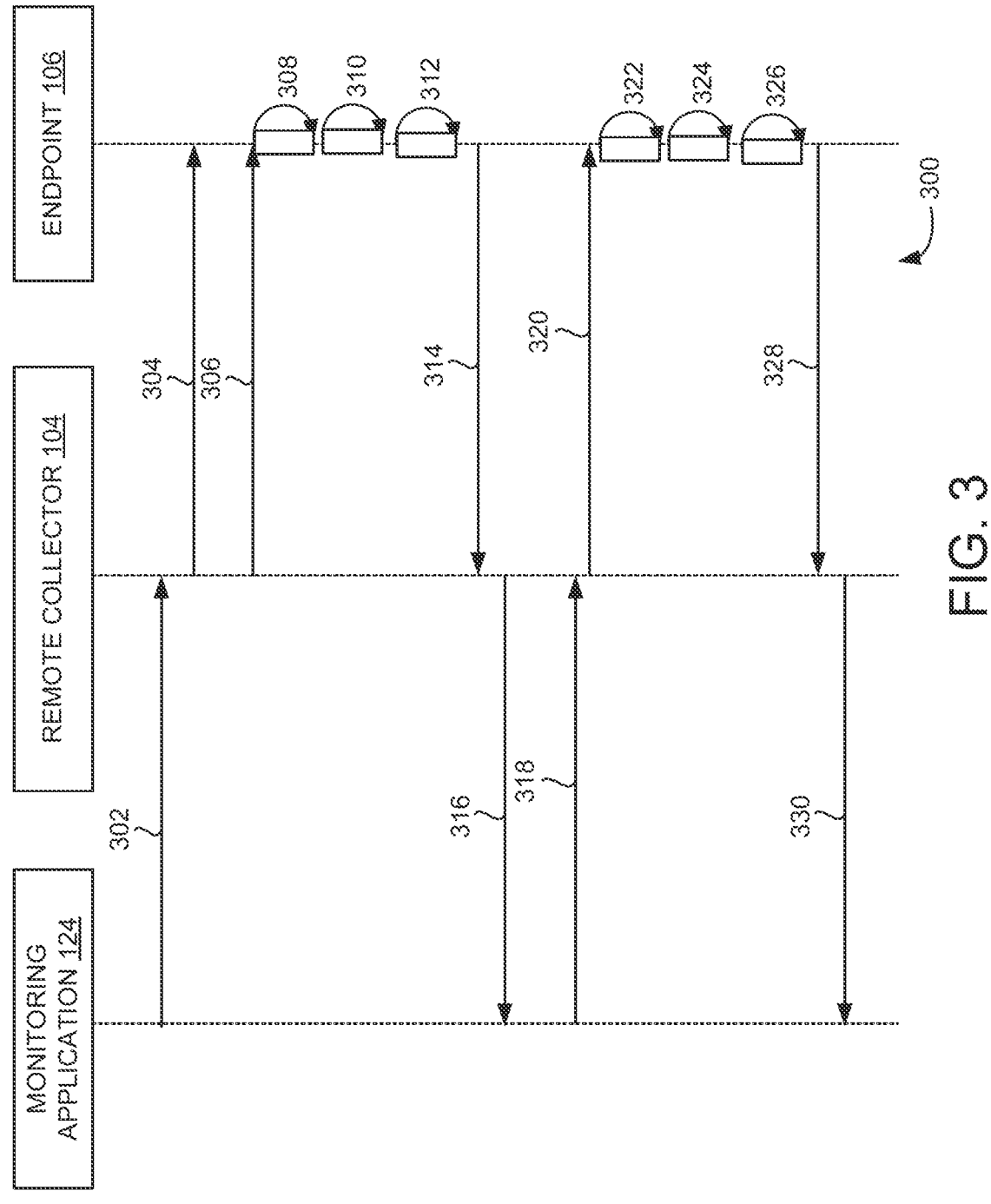
FIG. 3 is a sequence diagram illustrating an example sequence of events to configure a buffer limit of a monitoring agent for monitoring an endpoint.

FIG. 3 is a sequence diagram 300 illustrating an example sequence of events to configure a buffer limit of a monitoring agent for monitoring an endpoint 106 (e.g., as shown in FIG. 1). Sequence diagram 300 may represent the interactions and the operations involved in configuring the buffer limit to monitor endpoint 106. FIG. 3 illustrates process objects including a monitoring application 124 (e.g., monitoring application 124 of FIG. 1), remote collector 104 (e.g., remote collector 104 of FIG. 1), and endpoint (e.g., second endpoint 106 of FIG. 1) along with their respective vertical lines originating from them. The vertical lines of monitoring application 124, remote collector 104, and endpoint 106 may represent the processes that may exist simultaneously. The horizontal arrows (e.g., 302, 304, 306, 314, 316, 318, 320, 328, and 330) may represent the data flow steps between the vertical lines originating from their respective process objects (for e.g., monitoring application 124, remote collector 104, and endpoint 106). Further, activation boxes (e.g., 308, 310, 312, 322, 324, and 326) between the horizontal arrows may represent the process that is being performed in the respective process object.

At 302, monitoring application 124 may trigger installation of a monitoring agent (e.g., a Telegraf agent), for instance, from a user interface, an application programing interface, or a script. Upon triggering the installation, at 304, remote collector 104 may install the monitoring agent with input plugins on endpoint 106 to collect operating system metrics.

At 306, remote collector 104 may install a configuration agent (e.g., a salt minion) and a service discovery agent (e.g., a ucp minion) on endpoint 106. At 308, endpoint 106 may determine a first number of metrics per collection cycle corresponding to the input plugins by running the monitoring agent in a test mode. At 310, endpoint 106 may configure/update a buffer limit of the monitoring agent based on the first number of metrics per collection cycle. Upon configuring the buffer limit, the monitoring agent may be restarted, at 312, to enable the monitoring agent to collect the operating system metrics.

At 314, remote collector 104 may collect, from the service discovery agent, service discovery metrics specifying a curated list of applications running in endpoint 106. At 316, the curated list of applications discovered against endpoint 106 may be presented in a user interface of monitoring application 124. At 318, a plugin activation/deactivation action may be triggered from the user interface to enable/disable monitoring of an application of the curated list of applications. At 320, a salt state action may be initiated to add/delete monitoring agent's plugin configurations to enable/disable monitoring of the application. Upon adding/deleting monitoring agent's plugin configurations, at 322, endpoint 106 may determine a second number of metrics per collection cycle corresponding to the modified plugin configurations by running the monitoring agent in the test mode. At 324, endpoint 106 may update the buffer limit based on the second number of metrics per collection cycle. Upon updating the buffer limit, the monitoring agent may be restarted, at 326, to enable the monitoring agent to collect the operating system and/application metrics based on the modified plugin configurations. At 328, remote collector may collect the metrics from the monitoring agent based on the modified plugin configurations. At 330, remote collector 104 may update monitoring application 124 with the collected metrics.

FIG. 4 is a flow diagram illustrating an example method 400 for configuring a buffer limit of a monitoring agent for monitoring an endpoint. Example method 400 depicted in FIG. 4 represents generalized illustrations, and other processes may be added, or existing processes may be removed, modified, or rearranged without departing from the scope and spirit of the present application. In addition, method 400 may represent instructions stored on a computer-readable storage medium that, when executed, may cause a processor to respond, to perform actions, to change states, and/or to make decisions. Alternatively, method 400 may represent functions and/or actions performed by functionally equivalent circuits like analog circuits, digital signal processing circuits, application specific integrated circuits (ASICs), or other hardware components associated with the system. Furthermore, the flow chart is not intended to limit the implementation of the present application, but the flow chart illustrates functional information to design/fabricate circuits, generate computer-readable instructions, or use a combination of hardware and computer-readable instructions to perform the illustrated processes.

At 402, a monitoring agent with configuration data may be installed on an endpoint. In an example, the configuration data may specify a configuration for the monitoring agent to monitor an operation system executing in the endpoint. At 404, the monitoring agent may be executed in a test mode to determine a first number of metrics to be collected in one cycle based on the configuration data.

At 406, a buffer limit of the monitoring agent may be configured based on the first number of metrics. For example, the buffer limit is set equal to the first number of metrics or the first number of metrics along with a defined threshold. At 408, the configuration data may be updated to add a configuration for the monitoring agent to monitor a service running in the endpoint. In an example, a service discovery agent and a configuration agent may be installed on the endpoint. The service discovery agent may discover a plurality of services running in the endpoint and the configuration agent may receive command from a configuration master and execute the command. In an example, updating the configuration data may include discovering a list of services running in the endpoint using the service discovery agent and appending, using the configuration agent, an input plugin configuration to a configuration file of the monitoring agent for monitoring the service from the list of discovered services.

At 410, the monitoring agent may be executed in the test mode to determine a second number of metrics to be collected in one cycle based on the updated configuration data. At 412, the buffer limit may be updated based on the second number of metrics. Upon updating the buffer limit, at 414, the monitoring agent may be enabled to monitor the operating system and the service. In an example, the monitoring agent may be enabled to monitor the operating system and the service may include restarting the monitoring agent to enable the monitoring agent to monitor the operating system and the service upon updating the buffer limit in a configuration file of the monitoring agent.

In an example, the configuration data may be updated to remove, using the configuration agent, an input plugin configuration from a configuration file of the monitoring agent to disable monitoring of the service. Further, the monitoring agent may be executed in the test mode to determine a third number of metrics to be collected in one cycle upon removing the input plugin configuration from the configuration file. Furthermore, the buffer limit may be updated based on the third number of metrics. Upon updating the buffer limit corresponding to the third number of metrics, the monitoring agent may be enabled to monitor the endpoint.

Figure 5:
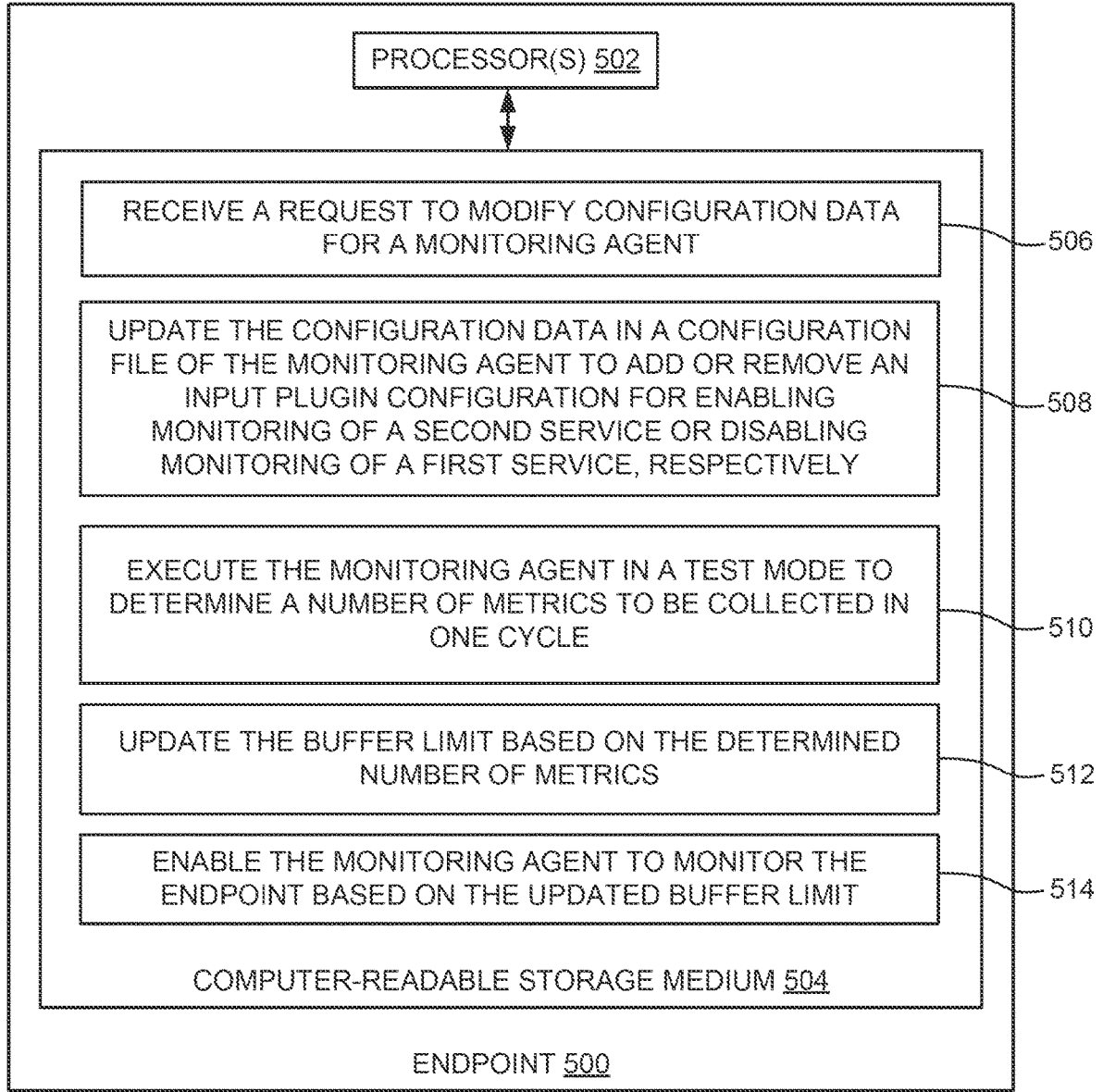
FIG. 5 is a block diagram of an example management node including non-transitory computer-readable storage medium storing instructions to enable a monitoring agent to monitor an endpoint based on an updated buffer limit.

FIG. 5 is a block diagram of an example management node 500 including non-transitory computer-readable storage medium 504 storing instructions to enable a monitoring agent to monitor an endpoint based on an updated buffer limit. Management node 500 may include a processor 502 and computer-readable storage medium 504 communicatively coupled through a system bus. Processor 502 may be any type of central processing unit (CPU), microprocessor, or processing logic that interprets and executes computer-readable instructions stored in computer-readable storage medium 504. Computer-readable storage medium 504 may be a random-access memory (RAM) or another type of dynamic storage device that may store information and computer-readable instructions that may be executed by processor 502. For example, computer-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 504 may be a non-transitory computer-readable medium. In an example, computer-readable storage medium 504 may be remote but accessible to management node 500.

Computer-readable storage medium 504 may store instructions 506, 508, 510, 512, and 514. Instructions 506 may be executed by processor 502 to receive a request to modify configuration data for a monitoring agent. The configuration data may specify a configuration for the monitoring agent to monitor an operation system and a first service executing in the endpoint. In an example, the endpoint may execute a configuration agent to receive, from a configuration master of a remote collector, the request to modify the configuration data. Further, the remote collector may monitor the endpoint via the monitoring agent and send monitored information associated with the endpoint to a monitoring application.

Based on the received request, instructions 508 may be executed by processor 502 to update the configuration data in a configuration file of the monitoring agent to add or remove an input plugin configuration for enabling monitoring of a second service or disabling monitoring of the first service, respectively.

Based on the updated configuration data, instructions 510 may be executed by processor 502 to execute the monitoring agent in a test mode to determine a number of metrics to be collected in one cycle. In an example, instructions 510 to execute the monitoring agent in the test mode may include instructions to execute the monitoring agent in the test mode based on the updated configuration data to determine the number of metrics to be collected in one cycle for the operating system, the first service, and the second service upon adding the input plugin configuration for enabling monitoring of the second service.

In an example, instructions 510 to execute the monitoring agent in the test mode may include instructions to, based on the updated configuration data, execute the monitoring agent in the test mode to determine the number of metrics to be collected in one cycle for the operating system upon removing the input plugin configuration for disabling monitoring of the first service. Upon updating the buffer limit, instructions to enable the monitoring agent to monitor the endpoint may include instructions to restart the monitoring agent to enable the monitoring agent to monitor the endpoint based on the updated configuration data.

In another example, instructions 510 to execute the monitoring agent in the test mode may include instructions to execute the monitoring agent in the test mode to determine the number of metrics to be collected in one cycle in response to detecting a change in the configuration data of the monitoring agent.

Instructions 512 may be executed by processor 502 to update the buffer limit based on the determined number of metrics. Upon updating the buffer limit, instructions 514 may be executed by processor 502 to enable the monitoring agent to monitor the endpoint.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A system comprising:
a first endpoint executing a remote collector; and
a second endpoint in communication with the first endpoint, wherein the remote collector is to monitor the second endpoint and send monitored information to a monitoring application, wherein the remote collector comprising an agent installation unit to:
install a monitoring agent with configuration data on the second endpoint, the configuration data specifying a configuration for the monitoring agent to monitor a first program executing in the second endpoint; and
wherein the second endpoint comprising a buffer limit configuration unit to:
execute the monitoring agent in a test mode to determine a first number of metrics to be collected in one cycle based on the configuration data;
configure a buffer limit of the monitoring agent based on the first number of metrics; and
upon configuring the buffer limit, enable the monitoring agent to monitor the first program.

2. The system of claim 1, wherein the buffer limit configuration unit is to:
update the configuration data to add a configuration for the monitoring agent to monitor a second program running in the second endpoint;
execute the monitoring agent in the test mode to determine a second number of metrics to be collected in one cycle based on the updated configuration data;
update the buffer limit based on the second number of metrics; and
upon updating the buffer limit, enable the monitoring agent to monitor the first program and the second program.

3. The system of claim 2, wherein each of the first program and the second program comprises an operating system, an application, or a combination thereof.

4. The system of claim 1, wherein the buffer limit configuration unit is to:
update the configuration data to remove the configuration for the monitoring agent to disable the monitoring of the first program;
execute the monitoring agent in the test mode to determine a third number of metrics to be collected in one cycle upon disabling the monitoring of the first program;
update the buffer limit based on the third number of metrics; and
upon updating the buffer limit corresponding to the third number of metrics, restart the monitoring agent to enable the monitoring agent to monitor the second endpoint.

5. The system of claim 1, wherein the agent installation unit is to:
install a service discovery agent on the second endpoint, wherein the service discovery agent is to discover a plurality of programs running in the second endpoint and send a list of the discovered programs to the remote collector; and
install a configuration agent on the second endpoint, wherein the configuration agent is to receive command from a configuration master of the remote collector and execute the command to add an input plugin configuration for enabling monitoring of a program or remove the input plugin configuration for disabling monitoring of the program.

6. The system of claim 5, wherein the remote collector is to:
render the list of the discovered programs on a user interface of the monitoring application;

receive, via the user interface of the monitoring application, an input plugin configuration to add a configuration for the monitoring agent to monitor a second program of the list of discovered programs running in the second endpoint; and initiate, via the configuration agent, a command to update the configuration data to add the input plugin configuration to a configuration file of the monitoring agent for monitoring the second program.

7. The system of claim 6, wherein the buffer limit configuration unit is to:

execute the monitoring agent in the test mode to determine a second number of metrics to be collected in one cycle based on the updated configuration data;

update the buffer limit based on the second number of metrics; and upon updating the buffer limit, restart the monitoring agent to enable the monitoring agent to monitor the first program and the second program.

8. The system of claim 5, wherein the remote collector is to:

receive, via the user interface of the monitoring application, an input to delete the configuration for the monitoring agent to disable monitoring of the first program; and initiate, via the configuration agent, a command to update the configuration data to remove the input plugin configuration from a configuration file of the monitoring agent to disable the monitoring of the first program.

9. The system of claim 8, wherein the buffer limit configuration unit is to:

execute the monitoring agent in the test mode to determine a third number of metrics to be collected in one cycle upon removing the input plugin configuration from the configuration file;

update the buffer limit based on the third number of metrics; and upon updating the buffer limit corresponding to the third number of metrics, restart the monitoring agent to enable the monitoring agent to monitor the second endpoint.

10. A non-transitory computer-readable storage medium having instructions executable by a processor of an endpoint to:

receive a request to modify configuration data for a monitoring agent, the configuration data specifying a configuration for the monitoring agent to monitor an operation system and a first service executing in the endpoint;

based on the received request, update the configuration data in a configuration file of the monitoring agent to add or remove an input plugin configuration for enabling monitoring of a second service or disabling monitoring of the first service, respectively;

based on the updated configuration data, execute the monitoring agent in a test mode to determine a number of metrics to be collected in one cycle;

update the buffer limit based on the determined number of metrics; and upon updating the buffer limit, enable the monitoring agent to monitor the endpoint.

11. The non-transitory computer-readable storage medium of claim 10, wherein the endpoint is to execute a configuration agent to receive, from a configuration master of a remote collector, the request to modify the configuration data, and wherein the remote collector is to monitor the endpoint via the monitoring agent and send monitored information associated with the endpoint to a monitoring application.

12. The non-transitory computer-readable storage medium of claim 10, wherein instructions to execute the monitoring agent in the test mode comprise instructions to:

based on the updated configuration data, execute the monitoring agent in the test mode to determine the number of metrics to be collected in one cycle for the operating system, the first service, and the second service upon adding the input plugin configuration for enabling monitoring of the second service.

13. The non-transitory computer-readable storage medium of claim 10, wherein instructions to execute the monitoring agent in the test mode comprise instructions to:

based on the updated configuration data, execute the monitoring agent in the test mode to determine the number of metrics to be collected in one cycle for the operating system upon removing the input plugin configuration for disabling monitoring of the first service.

14. The non-transitory computer-readable storage medium of claim 10, wherein instructions to enable the monitoring agent to monitor the endpoint comprise instructions to:

upon updating the buffer limit, restart the monitoring agent to enable the monitoring agent to monitor the endpoint based on the updated configuration data.

15. The non-transitory computer-readable storage medium of claim 10, wherein instructions to execute the monitoring agent in the test mode comprise instructions to:

execute the monitoring agent in the test mode to determine the number of metrics to be collected in one cycle in response to detecting a change in the configuration data of the monitoring agent.

16. A computer-implemented method comprising:

installing a monitoring agent with configuration data on an endpoint, the configuration data specifying a configuration for the monitoring agent to monitor an operation system executing in the endpoint;

executing the monitoring agent in a test mode to determine a first number of metrics to be collected in one cycle based on the configuration data;

configuring a buffer limit of the monitoring agent based on the first number of metrics;

updating the configuration data to add a configuration for the monitoring agent to monitor a service running in the endpoint;

executing the monitoring agent in the test mode to determine a second number of metrics to be collected in one cycle based on the updated configuration data;

updating the buffer limit based on the second number of metrics; and upon updating the buffer limit, enabling the monitoring agent to monitor the operating system and the service.

17. The computer-implemented method of claim 16, further comprising:

installing a service discovery agent and a configuration agent on the endpoint, the service discovery agent is to discover a plurality of services running in the endpoint, and the configuration agent is to receive command from a configuration master and execute the command.

18. The computer-implemented method of claim 17, wherein updating the configuration data comprises:

discovering a list of services running in the endpoint using the service discovery agent; and appending, using the configuration agent, an input plugin configuration to a configuration file of the monitoring agent for monitoring the service from the list of discovered services.

19. The computer-implemented method of claim 17, further comprising:

updating the configuration data to remove, using the configuration agent, an input plugin configuration from a configuration file of the monitoring agent to disable monitoring of the service;

executing the monitoring agent in the test mode to determine a third number of metrics to be collected in one cycle upon removing the input plugin configuration from the configuration file;

updating the buffer limit based on the third number of metrics; and upon updating the buffer limit corresponding to the third number of metrics, enabling the monitoring agent to monitor the endpoint.

20. The computer-implemented method of claim 17, wherein enabling the monitoring agent to monitor the operating system and the service comprises:

upon updating the buffer limit in a configuration file of the monitoring agent, restarting the monitoring agent to enable the monitoring agent to monitor the operating system and the service.

\* \* \* \* \*